W. S. LAWYER.
BRACKET FOR VEHICLE SPRINGS.
APPLICATION FILED AUG. 7, 1917.

1,264,662.

Patented Apr. 30, 1918.

Inventor
W. S. Lawyer.

UNITED STATES PATENT OFFICE.

WILLIAM S. LAWYER, OF WOODLAND, WASHINGTON.

BRACKET FOR VEHICLE-SPRINGS.

1,264,662.  Specification of Letters Patent.  Patented Apr. 30, 1918.

Application filed August 7, 1917. Serial No. 184,947.

*To all whom it may concern:*

Be it known that I, WILLIAM S. LAWYER, a citizen of the United States, and a resident of Woodland, in the county of Cowlitz and State of Washington, have invented a certain new and useful Improvement in Brackets for Vehicle-Springs, of which the following is a specification.

The present invention relates to vehicle body suspension springs, and more particularly to an improved connection between a forward transverse spring and the front axle of a motor vehicle.

An object of the present invention is to provide an improved connecting bracket adapted particularly for use on Ford cars and wherein the front transverse spring thereof may be elongated to increase the resiliency of the spring and to reduce the liability of breakage of the spring; to provide a bracket which combines therewith a connection for the front axle radius rod; and to provide a bracket the major portion of which is braced and supported by the end of the axle and the adjacent upstanding portion of the axle yoke.

The invention further aims at the provision of a connecting bracket of this character which may be made in one piece, and which may be quickly and easily installed to support a transverse spring of greater length than the springs now commonly employed.

The above, and various other objects and advantages of this invention will be in part described, and in part understood, from the following detailed description of the present preferred embodiment, the same being illustrated in the accompanying drawings wherein.

Figure 1:
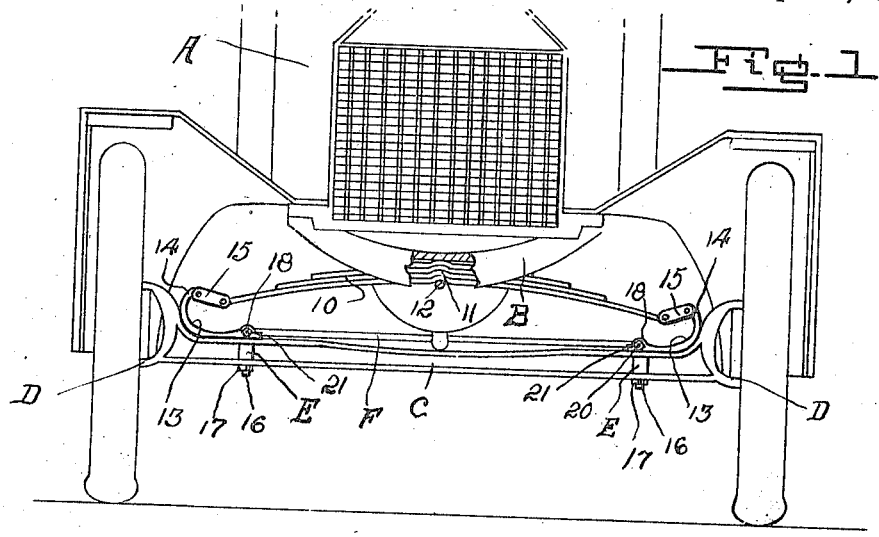
Figure 1 is a front elevation of a motor vehicle having a transverse spring mounted thereon, the spring being connected to the forward axle by a pair of connecting brackets constructed according to the present invention.
Figure 2:
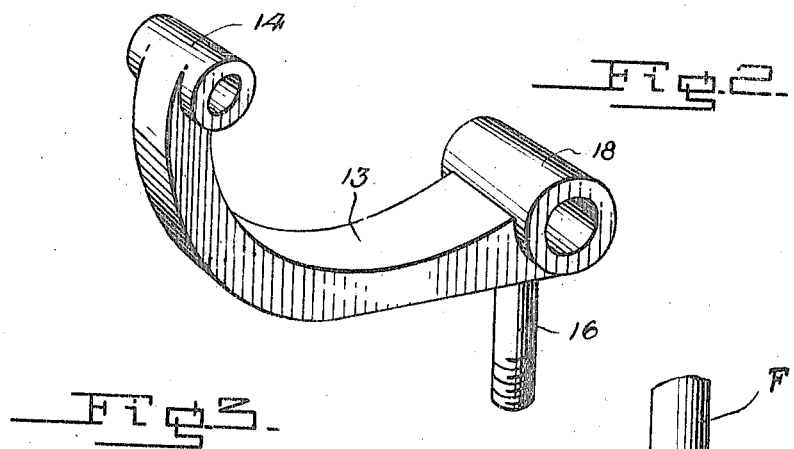
Fig. 2 is a perspective view of the bracket of this invention.
Figure 3:
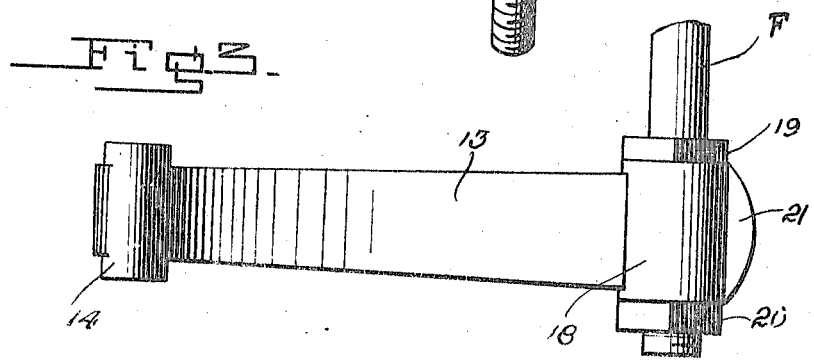
Fig. 3 is a top plan view of the bracket, showing a portion of a radius rod secured thereto.

Referring to this drawing, A designates the body of a motor vehicle provided with a forward transverse frame part B and a front axle C adapted to be connected to the frame part B.

In the lower channeled side of the frame part B is fitted a transversely extending spring 10 of the leaf type, and which is relatively long. The leaves forming the spring 10 are preferably crimped upwardly intermediate their ends as at 11, and are interfitted to hold the leaves of the spring from longitudinal displacement. A staple 12, or the like, is carried upon the first frame part B and engages across the lower side of the lowermost leaf. The staple 12 binds the crimped portions of the leaves together and holds the spring 10 within the channeled lower side of the part B. The opposite ends of the spring 10 extend to a point adjacent to the yoke D of the axle C.

The axle C is provided in the usual manner with yoke D at opposite ends having portions thereof extending upwardly above the horizontal plane of the upper edge of the axle. The axle C is also provided, at points near the yoke D, with vertically apertured sockets or eyes E, in the usual manner. The motor vehicle is provided, in the usual manner of Ford cars, with front axle radius rods F which diverge forwardly toward the sockets E.

The connecting bracket of this invention comprises a preferably one-piece casting or forging providing a curved elongated arm 13 adapted to seat upon the upper edge of the axle C near the yoke D thereof, and which is provided with an upwardly curved outer end conforming to the curvature of the upper edge of the yoke D, and which is diverged from the yoke D at its upper part and provided with a horizontally extending eye 14 adapted to receive therethrough the adjacent bolt of a shackle 15, the shackle being connected at its opposite end to the adjacent extremity of the spring 10. The arm 13 is supported by the axle C and also by the upstanding portion of the yoke D, a short length of the arm 13 only being unsupported, and said end overhanging to a slight extent the body portion of the arm 13 and being reinforced thereby.

The inner end of the arm 13 is provided with a relatively flat lower side adapted to lie against the upper edge of the axle C, and is provided with a depending threaded stem or bolt 15 adapted to engage through the socket E and receive a clamping nut 17 upon its lower end. Immediately above the stem 16, the arm 13 is provided with a transversely extending sleeve 18 through which the forward end of the adjacent radius rod F is adapted to engage. The radius rod F is held in the sleeve 18 by a pair of clamping nuts 19 and 20 which are threaded upon the rod F, and which engage against the opposite ends of the sleeve 18. The radius rod F is thus held from longitudinal movement through the sleeve 18 and the latter is held in position by the threaded stem 16 engaging through the axle C.

It is of course understood that one of these connecting brackets is mounted upon each end of the axle C, and that the arms 13 of the connecting brackets are supported by the upper edge of the axle C and also the upstanding portion of the yoke D. In this manner, the spring 10 may be of greater length than the distance between the sockets E of the axle as the upturned ends of the arms 13 are arranged adjacent to the yoke D and the shackles 15 are relatively short to accommodate a relatively long spring between the eyes 14 of the brackets.

By thus providing an elongated front spring, the vehicle body A is subjected to less shock and vibration, and the spring is not submitted to the shock and stress to which a shorter spring is subjected. The peculiar crimping and interfitting of the leaves of the spring at the intermediate portion thereof holds the leaves from longitudinal displacement with respect to each other, and obviates the necessity of extending a bolt or pin downwardly through the leaves intermediate their lateral edges, thus reinforcing and strengthening the parts of the spring. By crimping the leaves the staple 12 may be drawn tight to hold the interfitting crimped portions together and for thus retaining the leaves of the spring from longitudinal displacement and from twisting one upon the other.

It is of course understood that various changes and modifications may be made in the details of design of the above specifically described connecting bracket without departing from the spirit of this invention, such changes and modifications being restricted only by the scope of the following claims.

I claim:—

1. The combination with the front axle of a vehicle provided with vertical sockets near the ends thereof and yokes on its extremities, of a bracket carried upon each end of the axle and comprising an elongated arm adapted to rest upon the upper edge of the axle and against the inner side of the adjacent yoke, the free end of said arm being overturned slightly to overhang the body portion of the arm, a threaded stem projecting downwardly from the inner end of each bracket arm and adapted for engagement through one of said sockets of the axle, binding nuts on the lower ends of said stems to hold the bracket arms to the axle, and sleeves upon the inner ends of said arms to receive the forward extremities of vehicle radius rods therethrough.

2. The combination with the front axle of a vehicle provided with vertically apertured sockets near the ends thereof and having yokes upon its extremities, of a pair of spring supporting brackets mounted upon the opposite ends of the axle and comprising elongated arms extending along and lying against the upper edge of the axle and the inner side of the yokes, the outer ends of said arms being upturned from the yokes and adapted to have spring shackles secured thereto, and studs depending from the inner ends of said bracket arms and engaging through said vertical openings in the axle sockets.

3. A connecting bracket for vehicle springs, having an elongated arm curved upwardly at its outer end and provided with a depending stud upon its inner end, said outer end of the arm being slightly overturned upon the body portion of the arm and having a transversely extending eye whereby a spring shackle may be secured thereto, said inner end of the arm having a transversely extending sleeve arranged immediately above the stud.

4. As an article of manufacture, a connecting bracket for vehicle springs comprising an arcuate arm having a transversely extending eye portion on its outer end and provided with a transversely apertured and enlarged sleeve portion upon its opposite inner end, said arm also having upon its inner end a depending threaded stem adapted to receive a binding nut thereon.

WILLIAM S. LAWYER.